United States Patent
Wang et al.

(10) Patent No.: US 6,922,985 B2
(45) Date of Patent: Aug. 2, 2005

(54) EXHAUST CATALYST MONITORING ARRANGEMENT

(75) Inventors: Wei Wang, Troy, MI (US); Jason E Wielenga, Jackson, MI (US); Bill Leisenring, Tecumseh, MI (US); Douglas M Stander, Grosse Pt. Woods, MI (US); Dave Carlson, Williamston, MI (US); Mark J Poublon, Shelby Township, MI (US); Chris J Booms, Milford, MI (US); Tom Stephens, Dearborn, MI (US); Craig Summers, Northville, MI (US); Danny K Schuelke, Grass Lake, MI (US); Richard K Moote, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 74 days.

(21) Appl. No.: 10/348,553

(22) Filed: Jan. 21, 2003

(65) Prior Publication Data

US 2004/0139732 A1 Jul. 22, 2004

(51) Int. Cl.$^7$ ................................. F01N 3/00
(52) U.S. Cl. ..................... 60/277; 60/274; 60/276; 60/285; 701/103; 701/107
(58) Field of Search ................ 60/274, 276, 277, 60/285; 73/23.31, 23.32, 118.1; 701/103, 107, 109, 114

(56) References Cited

U.S. PATENT DOCUMENTS 5,412,941 A * 5/1995 Suzuki et al. ................ 60/276
5,545,377 A * 8/1996 Fukaya et al. .............. 422/108
5,724,809 A * 3/1998 Mitsutani et al. ............ 60/276
5,732,553 A * 3/1998 Mitsutani ..................... 60/276
5,743,086 A * 4/1998 Nagai .......................... 60/276
5,847,271 A   12/1998 Poublon et al. ............ 73/118.1
5,899,062 A * 5/1999 Jerger et al. ................. 60/274
5,945,597 A   8/1999 Poublon et al. ........... 73/118.1
5,983,629 A * 11/1999 Sawada ........................ 60/276
6,006,153 A   12/1999 Stander et al. ............. 701/109
6,035,632 A   3/2000 Stander et al. ............... 60/274
6,425,242 B2  7/2002 Booth et al. ................. 60/277

OTHER PUBLICATIONS

SAE Paper 942057, "A Review of the Dual EGO Sensor Method for OBD–II Catalyst Efficiency Monitoring" by J.S. Hepburn et al. , Oct. 17–20, 1994.

* cited by examiner

*Primary Examiner*—Tu M. Nguyen
(74) *Attorney, Agent, or Firm*—Ralph E. Smith

(57) ABSTRACT

In a motor vehicle having an engine with an exhaust catalyst and an oxygen sensor upstream of the catalyst and an oxygen sensor downstream of the catalyst, a method for detecting whether the catalyst has aged. Over a test block period of time, the method periodically obtains upstream data points from an oxygen sensor located upstream of the catalyst and from and oxygen sensor located downstream of the catalyst. Absolute differences are calculated between consecutive pairs of the upstream data points and the downstream data points. A ratio between the sums of absolute differences is then calculated, and the ratio is used to determine whether the catalyst has aged.

6 Claims, 3 Drawing Sheets

EXHAUST CATALYST MONITORING ARRANGEMENT

FIELD OF THE INVENTION

The present invention relates to monitoring a catalyst in a motor vehicle, and in particular, to a method for detecting an aged catalyst.

BACKGROUND OF THE INVENTION

Catalytic converters are devices used to reduce pollutants from motor vehicle exhaust gases. Catalysts promote chemical reactions that convert pollutants such as carbon monoxide (CO), hydrocarbons (HC), and oxides of nitrogen ($NO_x$) into carbon dioxide, water, and nitrogen. The United States government stringently regulates the emission levels of these pollutants.

Oxygen sensors are used to monitor the performance of a catalyst by detecting the oxygen levels in the exhaust gas both upstream and downstream from the converter. Generally, when a catalyst deteriorates it loses part of its oxygen storage capacity and thus, part of the untreated exhaust gas breaks through the catalyst causing the downstream oxygen sensor to deviate from a neutral, stoichiometric position.

Using a present method, an aged catalyst may be detected by first biasing the oxygen level in the exhaust stream to a rich or lean amount. The present method then maintains counts of rich/lean and lean/rich transitions of the upstream and downstream oxygen sensors. A ratio of the counts is then used to determine the amount of untreated exhaust gas breaking through the catalyst. While this method is generally effective, it also suffers drawbacks making it only unsatisfactorily suitable for future vehicles.

First, the existing detection method is intrusive to the engine fueling control system and thereby increases pollutant emissions while the method executes. This intrusive property makes it increasingly difficult to simultaneously satisfy the requirements of detecting an aged catalyst and maintaining low levels of pollutant emissions.

Second, since pollutant emissions are increased while the existing method executes there exists an urgency to conclude the method as quickly as possible. This urgency in execution may lead to incorrect conclusions as to whether the catalyst is aged. Such incorrect conclusions may result in unnecessary expense for catalyst replacement.

Third, the existing method has difficulty differentiating between rich/lean oxygen sensor switching that is caused by exhaust gas and similar switching that is caused by electrical noise or a hypersensitive oxygen sensing element. While software filtering may be used to help differentiate between the causes of rich/lean switching, such software filters are often complex.

SUMMARY OF THE INVENTION

Accordingly, one aspect of the present invention is to provide a method of detecting an aged catalyst whereby the method operates non-intrusively, i.e. without adversely affecting the engine fueling control system.

It is another aspect of this invention to provide a method of detecting an aged catalyst while minimizing levels of pollutant emissions.

It is yet another aspect of the present invention to provide a method of detecting an aged catalyst whereby the method may operate without urgency in making a determination of whether the catalyst has aged.

It is still another aspect of the present invention to provide a method of detecting an aged catalyst whereby the method is tolerant of excessive rich/lean switching and provides a simple software algorithm to filter undesirable oxygen sensor switching.

In accordance with these aspects of the present invention, a method is presented for detecting whether a catalyst has aged. Over a test block period of time, the method periodically obtains upstream data points from an oxygen sensor located upstream of the catalyst and from and an oxygen sensor located downstream of the catalyst. Absolute differences are calculated between consecutive pairs of the upstream data points and the downstream data points. A ratio between the sums of absolute differences is then calculated, and the ratio is used to determine whether the catalyst has aged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description is merely exemplary in nature and is in no way intended to limit the invention, its applications, or uses.

Figure 1:
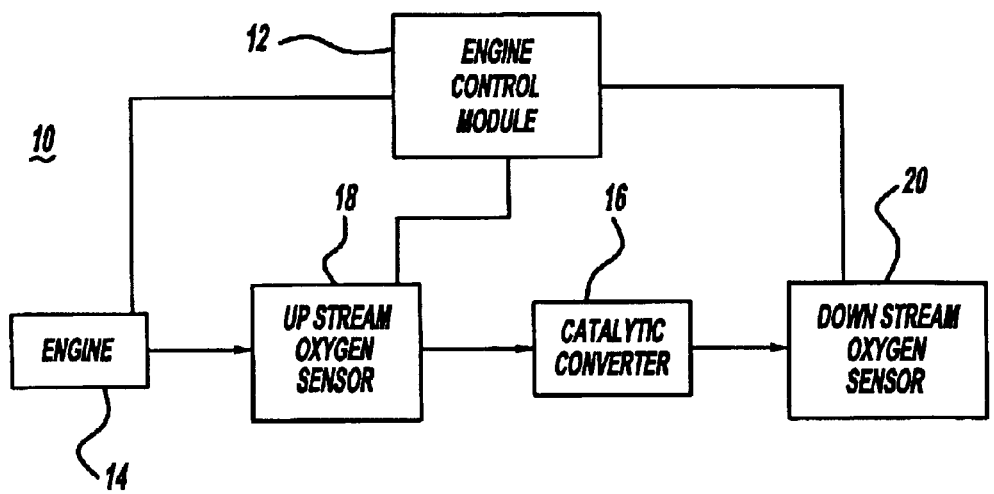
FIG. 1 is a block diagram showing the components of an exhaust catalyst monitoring arrangement in accordance with the present invention.

FIG. 1 illustrates an exhaust catalyst monitoring arrangement 10 having an engine control module (ECM) 12, a motor vehicle engine 14, a catalytic converter having a catalyst 16, an upstream oxygen sensor 18, and a downstream oxygen sensor 20. Upstream oxygen sensor 18 monitors the level of oxygen in exhaust gases between motor vehicle engine 14 and catalytic converter 16. Downstream oxygen sensor 20 monitors the level of oxygen in the exhaust gases flowing from catalytic converter 16. The ECM 12 controls the engine 14 about a stoichiometric operating point and executes a non-intrusive method for detecting an aging catalyst as described herein.

Figure 2:
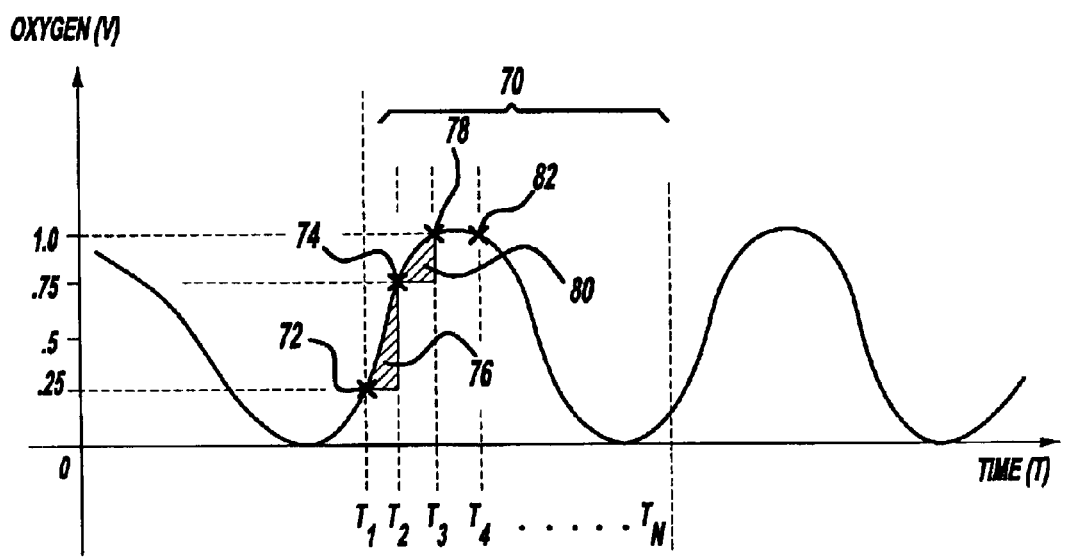
FIG. 2 is a diagram illustrating an output signal from an oxygen sensor in accordance with the present invention.

Turning to FIG. 2, an exemplary upstream and downstream oxygen sensor output voltage signal, or waveform, is shown over time. It should be appreciated the actual frequency, amplitude, symmetry, offset, and other waveform properties experienced in practice will vary according to electrical properties of the chosen oxygen sensors 18, 20, combustion properties of the engine 14, whether the waveform is from the upstream or downstream oxygen sensor, and also the degree of catalyst aging. For example, the waveform from a downstream oxygen sensor is expected to exhibit an increase in frequency commensurate with the age of the catalyst, provided the ECM 12 is controlling the engine 14 about a stoichiometric fuel/air operating point.

The method described later herein operates upon data points taken from the upstream 18 and downstream 20 oxygen sensor waveforms. Data points for each sensor are taken during a testing block 70 at time intervals $T_1, T_2, \ldots T_N$. Upon taking each data point at time intervals $T_2, T_3, \ldots T_N$, the method calculates the absolute difference between the most recent data point read and the previous data point read. For example, once data point 74 is read, the absolute difference between the magnitudes of data points 74 and 72 is calculated, as represented by the magnitude of shaded region 76. Similarly, once data point 78 is read, the absolute difference between data points 78 and 74 will be calculated as represented by the magnitude of shaded region 80. The method also maintains accumulators for summation of absolute differences in each upstream and downstream waveform over the testing block 70.

Figure 3A:
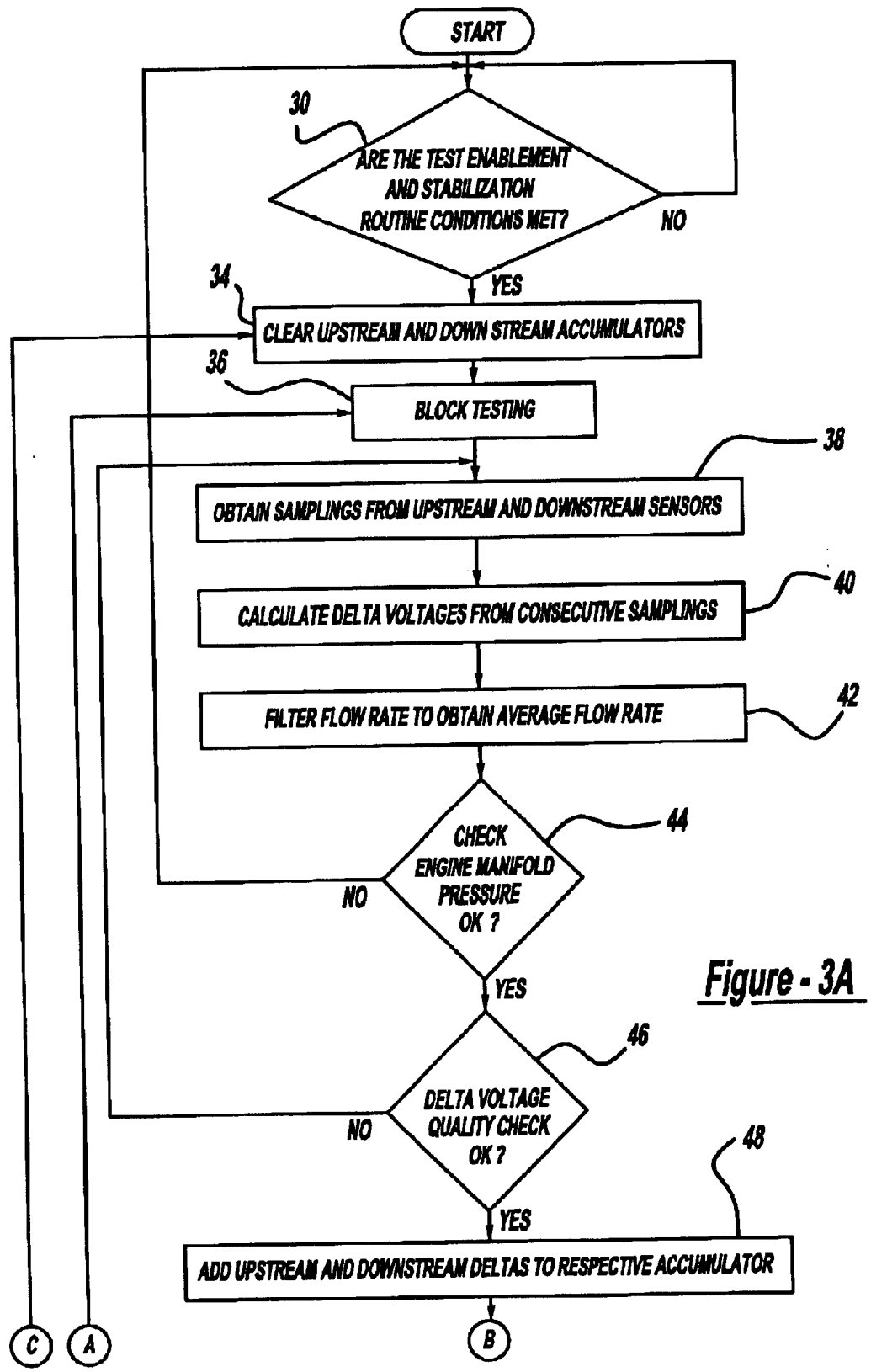
FIGS. 3A and 3B are a flow chart depicting a method of detecting an aged catalyst in accordance with the present invention.
Figure 3B:
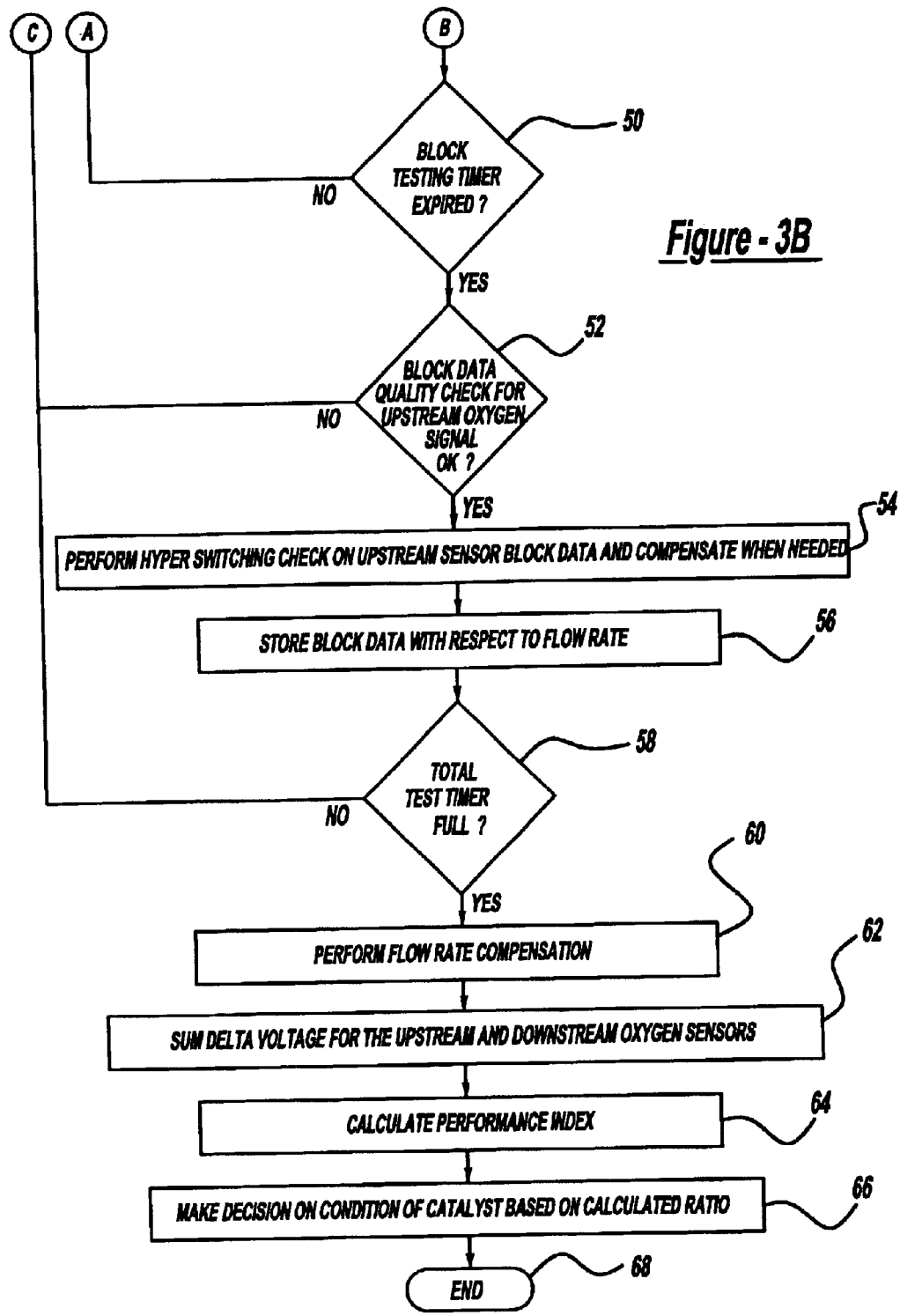

Turning to FIGS. 3A and 3B, a method for detecting an aged catalyst is presented. In the present example, the method is executed by the engine control module 12, however it is foreseeable that the method may also be executed by other devices having access to signal information from oxygen sensors 18 and 20. At the onset, an enablement and stabilization routine step is executed at decision block 30 to determine whether engine 14 operating conditions are satisfactory for detection of an aged catalyst 16. Satisfactory conditions generally include steady-state engine operation within minimum and maximum engine speeds, a catalyst temperature sufficient for efficient operation of the catalyst, functioning oxygen sensors, and the ECU 12 providing unbiased closed loop fuel control to the engine 14. If enablement conditions are not met in decision block 30, the method checks again until the desired enablement conditions are satisfied and continue to be satisfied for a predetermined amount of time. Once enabled, the method continues to block 34 where the upstream and downstream accumulators are cleared in preparation of beginning a testing block 70.

From block 34, the method proceeds to block 36, thereby indicating a testing block 70 is in process. From block 36, the method proceeds to block 38 wherein the upstream and downstream oxygen sensor signals are sampled and data points are obtained therefrom. Once the method has obtained the recent upstream and downstream data points, the method continues to block 40 wherein the absolute differences are calculated between the recent and previous upstream data points and the recent and previous downstream data points. If this is the initial pass through block 40 since beginning testing block 70, the method may set the absolute differences to zero.

In block 40 the method also checks the recent upstream data point to determine whether the magnitude of the recent data point is either greater than or less than any previous peak upstream data point taken during testing block 70. If the recent data point is greater than a previous peak maximum point, the recent data point is stored in a peak maximum register. Similarly, if the recent data point is less than a peak minimum point, the recent data point is stored in a peak minimum register. The stored peak minimum and maximum upstream data points are used in block 52, which is described later.

Once the absolute differences are calculated at block 40, the method proceeds to block 42 where the air flow rate into the engine is obtained either directly or indirectly as is known in the art, and filtered through a low pass filter to obtain an average flow rate. At decision block 44, another engine condition check is performed to verify that engine 14 has not experienced an abrupt change in manifold pressure that may adversely affect the outcome of the method. If a pressure change has occurred, testing block 70 is aborted and the method returns to the enablement and stabilization routine at block 30.

At decision block 46 a logic filter is applied to the each of the absolute differences to prevent noise and quantization errors. In one aspect of the invention, the logic filter is implemented such that if the most recent absolute difference is less than a threshold value, the absolute difference is set to zero and the method returns to block 38. An example of such a situation is depicted at FIG. 2, data points 78 and 82. The logic filter operates to prevent the method from reacting to electrical noise and quantization errors that may be present in the catalyst monitoring arrangement 10. Once the logic filter processes the recent upstream and downstream absolute differences, the method proceeds to block 48 where the absolute differences are added to their respective accumulators, thereby maintaining sums of the respective absolute differences over the testing block 70.

Further, at decision block 50, the method performs a check for the expiration of the testing block 70. If the testing block 70 is incomplete the method returns to block 36 and repeats the steps described above. If the testing block 70 has expired, a quality check is performed on the data from upstream oxygen sensor 18.

The quality check at decision block 52 operates to ensure the degree of rich/lean activity in the upstream oxygen sensor 18 was sufficient over the testing block 70 to provide meaningful data from the downstream oxygen sensor 20. In one aspect of the invention, the quality check may be performed by first comparing the value of the upstream accumulator to a predetermined value. If the value of the upstream accumulator is less than the predetermined value, the upstream and downstream accumulator values are ignored and the method proceeds to initiate a new testing block 70. If the upstream accumulator is greater than the predetermined value, the quality check continues by calculating the difference between the peak minimum and maximum data points stored previously in block 40. If this difference is less than a predetermined value, the method also ignores the accumulators and proceeds to initiate a new testing block 70. Otherwise, the method proceeds to block 54.

In block 54 the value of the recent upstream accumulator is compared to a predetermined value to establish whether the upstream oxygen sensor 18 experienced hyperswitching during the test block 70. Hyperswitching refers to a condition whereby an oxygen sensor is mistriggered by electrical noise or other interference, thereby causing the sensor to switch erratically. Hyperswitching is declared when the comparison shows that the recent upstream accumulator value is greater than a predetermined threshold. If hyperswitching is declared, a compensated upstream value is obtained by multiplying the recent upstream accumulator value by a hyperswitching compensation value selected according to the average flow rate determined previously at block 42. The hyperswitching compensation values may be obtained experimentally by observing upstream hyperswitching activity in the catalyst monitoring arrangement 10 and choosing compensation values that correlate hyperswitching upstream accumulator values to non-hyperswitching upstream accumulator values. The hyperswitching compensation values will be between 0 and 1.

Experiments performed by the inventors have yielded satisfactory hyperswitching compensation values between 0.7 and 0.9.

Moving to block 56, the method stores the values from the upstream and downstream accumulators in a cell array correlating the values with the average flow rate determined in block 42. The value stored from the upstream accumulator may be the raw value or, if hyperswitching was detected at block 54, the compensated value.

The method then continues to decision block 58 where a total test timer is checked for expiration. The duration of the total test time is preferably selected to accommodate a plurality of test blocks 70. If, at decision block 58, the total test timer is unexpired, the process begins another test block 70 by returning to block 34. Conversely, if the total test timer has expired, the method proceeds to block 60.

At block 60 the method prepares to determine whether the catalyst has aged by normalizing the accumulated upstream and downstream values in the cell array. Normalization may be performed by multiplying each cell value by a constant related to the average flow rate determined in step 42. In experiments performed by the inventors, satisfactory values of corresponding constants varied from between about 0 to about 2, with most being approximately equal to 1.

Once the upstream and downstream cell values have been normalized the method proceeds to block 62 where the upstream cell values are summed to obtain an upstream sum and the downstream cell values are summed to obtain a downstream sum. In block 64, the method calculates a catalyst performance index by determining the ratio between the upstream sum and the downstream sum. While the index may be determined by either dividing the upstream sum by the downstream sum or dividing the downstream sum by the upstream sum, the latter is preferred since it is foreseeable that the downstream sum may be equal to zero and the latter method avoids additional steps in treating a divide-by-zero situation.

At block 66 the method makes a determination, based on the calculated catalyst performance index, as to whether the catalyst is acceptable or unacceptable. An acceptable catalyst has a performance index less than a calibratable threshold indicating that the signal from downstream sensor 20, which represents the amount of oxygen in the downstream exhaust gases, experienced very little change from a neutral, stiochiometric position over the total testing time. An unacceptable catalyst, however, has a performance index greater than a calibratable threshold indicating that the downstream oxygen level is closely following the upstream oxygen level, indicating an unacceptable depletion in the catalyst's oxygen storage capacity. Generally, the value for the calibratable threshold is between 0.3–0.8.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a motor vehicle having an engine with an exhaust catalyst and an oxygen sensor upstream of the catalyst and an oxygen sensor downstream of the catalyst, a method for detecting whether the catalyst has aged, the method comprising the steps of:

while maintaining a total test timer, executing a plurality of test blocks, each test block further comprising (a) periodically obtaining upstream data points from the oxygen sensor located upstream of the catalyst, (b) periodically obtaining downstream data points from the oxygen sensor located downstream of the catalyst, (c) calculating upstream absolute differences between consecutive pairs of said upstream data points, (d) calculating downstream absolute differences between consecutive pairs of said downstream data points, and (e) summing said upstream absolute differences in an upstream accumulator and summing said downstream absolute differences in a downstream accumulator, upon the expiration of said total test timer, adding together values in each said downstream accumulator to arrive at a downstream sum, adding together values in each said upstream accumulator to arrive at an upstream sum, and calculating a ratio between said downstream sum and said upstream sum, whereby an aged catalyst is detected by comparing said ratio to a first predetermined value, and compensating the value in said upstream accumulator by a hyperswitching compensation value chosen according to a filtered air flow rate through the engine.

2. In a motor vehicle having an engine with an exhaust catalyst and an oxygen sensor upstream of the catalyst and an oxygen sensor downstream of the catalyst, a method for detecting whether the catalyst has aged, the method comprising the steps of:

while maintaining a total test timer, executing a plurality of test blocks, each test block further comprising (a) periodically obtaining upstream data points from the oxygen sensor located upstream of the catalyst, (b) periodically obtaining downstream data points from the oxygen sensor located downstream of the catalyst, (c) calculating upstream absolute differences between consecutive pairs of said upstream data points, (d) calculating downstream absolute differences between consecutive pairs of said downstream data points, (e) summing said upstream absolute differences in an upstream accumulator and summing said downstream absolute differences in a downstream accumulator, (f) determining a filtered air flow rate through the engine, and storing the value in said upstream accumulator and the value in said downstream accumulator in a cell array indexed by aid filtered air flow rate; and upon the expiration of said total test timer, normalizing said values stored in said cell array, adding the normalized upstream values in said cell array to arrive at an upstream sum, and adding a normalized downstream values in said cell array to arrive at a downstream sum, and calculating a ratio between said downstream sum and said upstream sum, whereby an aged catalyst is detected by comparing said ratio to a first predetermined value.

3. In a motor vehicle having an engine with an exhaust catalyst and an oxygen sensor upstream of the catalyst and an oxygen sensor downstream of the catalyst, a method for detecting whether the catalyst has aged, the method comprising the steps of:

while maintaining a total test timer and while the engine is being operated in an unbiased closed loop fuel control condition, executing a plurality of test blocks, each test block further comprising (a) periodically obtaining upstream data points from the oxygen sensor located upstream of the catalyst, (b) periodically obtaining downstream data points from the oxygen sensor located downstream of the catalyst, (c) calculating upstream absolute differences between consecutive pairs of said upstream data points, (d) calculating downstream absolute differences between consecutive pairs of said downstream data points, (e) summing said upstream absolute differences in an upstream accumulator and summing said downstream absolute differences in a downstream accumulator; and upon the expiration of said total test timer, adding together values in each said downstream accumulator to arrive at a downstream sum, adding together values in each said upstream accumulator to arrive at an upstream sum, and calculating a ratio between said downstream sum and said upstream sum, whereby an aged catalyst is detected by comparing said ratio to a first predetermined value; and whereby upon calculating said downstream sum and said upstream sum, including in the calculation only the downstream accumulators and upstream accumulators from test blocks with said upstream accumulator greater than a second predetermined value.

4. In a motor vehicle having an engine with an exhaust catalyst and an oxygen sensor upstream of the catalyst and an oxygen sensor downstream of the catalyst, a method for detecting whether the catalyst has aged, the method comprising the steps of:

while maintaining a total test timer and while the engine is being operated in an unbiased closed loop fuel control condition, executing a plurality of test blocks, each test block further comprising (a) periodically obtaining upstream data points from the oxygen sensor located upstream from the catalyst, (b) periodically obtaining downstream data points from the oxygen sensor located downstream of the catalyst, (c) calculating upstream absolute differences between consecutive pairs of said upstream data points, (d) calculating downstream absolute differences between consecutive pairs of said downstream data points, (e) summing said upstream absolute differences in an upstream accumulator and summing said downstream absolute differences in a downstream accumulator, upon the expiration of said total test timer, adding together values in each said downstream accumulator to arrive at a downstream sum, adding together values in each said upstream accumulator to arrive at an upstream sum, and calculating a ratio between said downstream sum and said upstream sum, whereby an aged catalyst is detected by comparing said ratio to a first predetermined value, and (f) applying a logic filter, said logic filter eliminating a result of each of said difference calculations that results in a difference less than a threshold value.

5. In a motor vehicle having an engine with an exhaust catalyst and an oxygen sensor upstream of the catalyst and an oxygen sensor downstream of the catalyst, a method for detecting whether the catalyst has aged, the method comprising the steps of:

while maintaining a total test timer and while the engine is being operated in an unbiased closed loop fuel control condition, executing a plurality of test blocks, each test block further comprising (a) periodically obtaining upstream data points from the oxygen sensor located upstream of the catalyst, (b) periodically obtaining downstream data points from the oxygen sensor located downstream of the catalyst, (c) calculating upstream absolute differences between consecutive pairs of said upstream data points, (d) calculating downstream absolute differences between consecutive pairs of said downstream data points, (e) summing said upstream absolute differences in an upstream accumulator and summing said downstream absolute differences in a downstream accumulator;

(f) detecting a peak minimum upstream data point and a peak maximum upstream data point from said upstream data points obtained during said test block period, and upon the expiration of said total test timer, adding together values in each said downstream accumulator to arrive at a downstream sum, adding together values in each said upstream accumulator to arrive at an upstream sum, and calculating a ratio between said downstream sum and said upstream sum, whereby an aged catalyst is detected by comparing said ratio to a first predetermined; value whereby upon calculating said downstream sum and said upstream sum, including in the calculation only the downstream accumulators and upstream accumulators from test blocks with a difference between said peak maximum and peak minimum upstream data points greater than a second predetermined value.

6. The method of claim 5, each test block further comprising determining a filtered air flow rate through the engine, and storing the value in said upstream accumulator and the value in said downstream accumulator in a cell array indexed by said filtered air flow rate.

* * * * *